C. REYNOLDS.
NON-SKID AND EXTRA TORQUE AUTOMOBILE EQUIPMENT.
APPLICATION FILED JULY 12, 1919.
1,334,923. Patented Mar. 23, 1920.
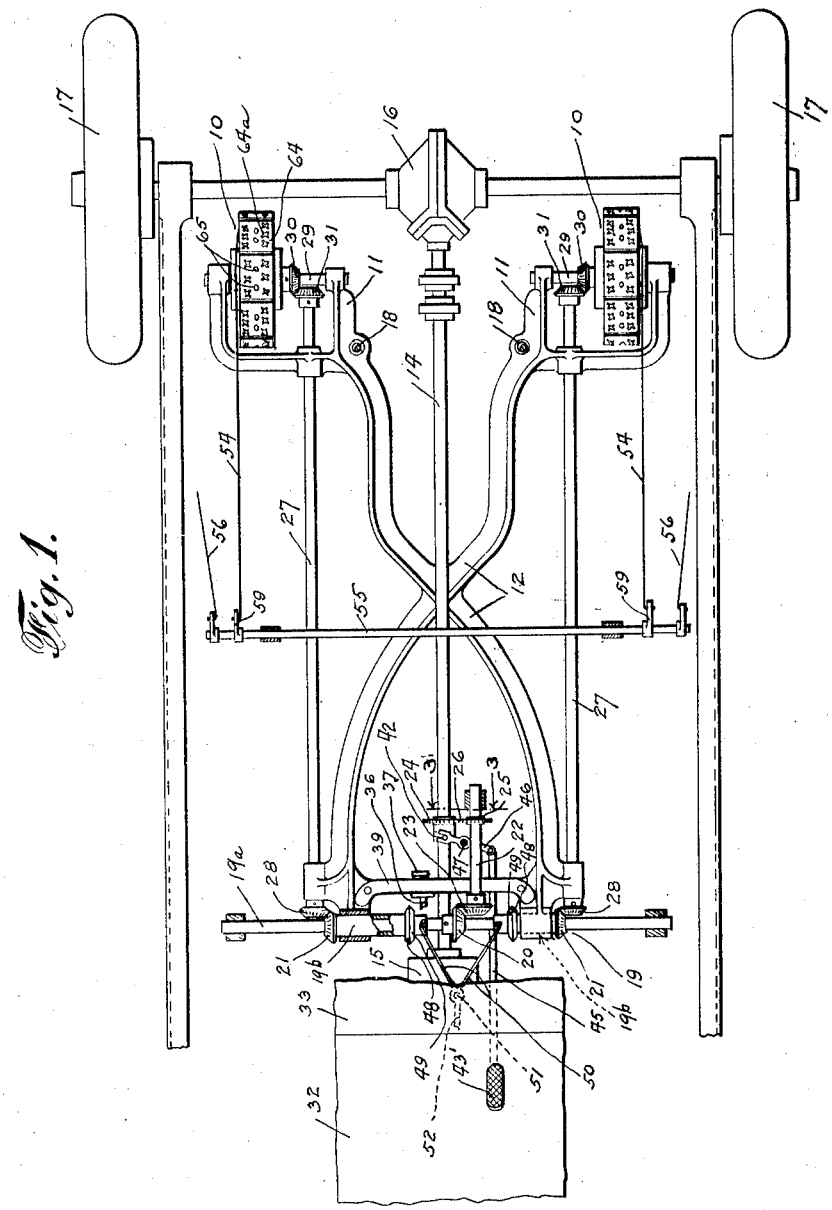

C. REYNOLDS.
NON-SKID AND EXTRA TORQUE AUTOMOBILE EQUIPMENT.
APPLICATION FILED JULY 12, 1919.
1,334,923.
Patented Mar. 23, 1920.
2 SHEETS—SHEET 2.
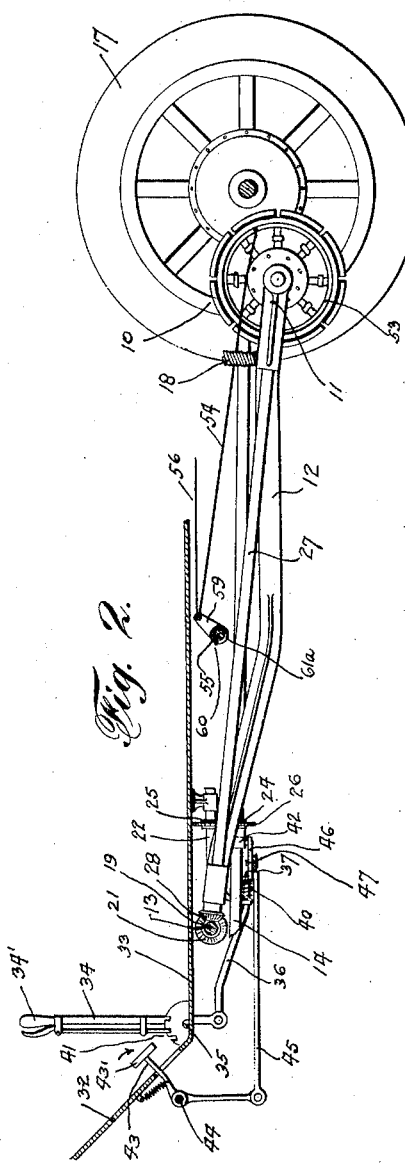
Christopher Reynolds, Inventor
By his Attorneys
Mason, Fenwick & Lawrence.

UNITED STATES PATENT OFFICE.

CHRISTOPHER REYNOLDS, OF NEW YORK, N. Y.

NON-SKID AND EXTRA-TORQUE AUTOMOBILE EQUIPMENT.

1,334,923.

Specification of Letters Patent.  Patented Mar. 23, 1920.

Application filed July 12, 1919. Serial No. 310,497.

*To all whom it may concern:*

Be it known that I, CHRISTOPHER REYNOLDS, a citizen of the British Empire, residing at New York, in the county of New York and State of New York, have invented certain new and useful Improvements in Non-Skid and Extra-Torque Automobile Equipment; and I do hereby declare the following to be a full, clear, and exact description of the invention, such as will enable others skilled in the art to which it appertains to make and use the same.

This invention relates to automobiles, and more particularly provides a novel construction for increasing at will the tractive power of the engine, for preventing skidding, or for both.

The invention is broadly carried out by utilizing a pair of extra traction wheels, preferably of smaller diameter than the usual rear traction wheels of the automobile, so that the extra wheels may be normally elevated above the road and under the chassis near the rear axle and differential, and by providing controlling means for lowering these extra wheels when desired into contact with the road and for driving them when desired from the engine of the automobile, say by way of the propeller shaft.

In order to adapt the construction for special and practically universal efficiency so far as increasing the tractive power of the engine is concerned, particularly when the extra wheels are only temporarily lowered for pulling the automobile out of a bad hole, the invention also preferably provides manually operable means for coupling and uncoupling the drive for the extra wheels or for one of the wheels as selected; another preferable feature of the invention being the provision of means for affording such a controllable drive.

The invention also includes, as preferred features, means to hold said extra wheels yieldingly in contact with the road when depressed, to take care of road irregularities, and manually operable brake-means for the extra-wheels, preferably operated automatically upon operation of the usual hand or emergency brakes.

In order to adapt the construction for great efficiency in overcoming skidding, as on wet pavements, the peripheral construction of the extra wheels is specially designed, as will be clear hereinafter; such wheels also having other special structural features, as will also be clear hereinafter, for meeting situation where the extra wheels must work through snow, mud or dust accumulations on the road, and for increasing the ease of operation and responsiveness of the brake-means for the extra wheels. A lesser feature of the invention is the construction and relation of the parts and attachments of the extra wheels to give a compact and a sturdy construction for each wheel and to adapt each wheel to have the particular advantages referred to in this paragraph.

The invention will be more clearly understood from the following description, when taken in connection with the accompanying drawings, showing an illustrative embodiment of the invention as at present preferred.

In these drawings,

Figure 1 is a top plan view of an automobile equipped with said embodiment, with certain parts of the automobile omitted, particularly the front wheels and most of the chassis;

Fig. 2 is a side elevation, showing the parts of Fig. 1;

Fig. 3 is an enlarged detail view, being a section on line 3—3 of Fig. 1;

Fig. 4 is an enlarged detail view, being a perspective showing certain of the parts of Figs. 1 and 2;

Fig. 5 is an enlarged detail view showing one of the auxiliary wheels as viewed in side elevation from the center of the automobile; and Fig. 6 is a fragmentary section, taken on line 6—6 of Fig. 5.

Similar reference characters refer to similar parts throughout the several views of the drawings.

Referring to Figs. 1 and 2, the extra or auxiliary wheels are indicated at 10, the movable supports for these wheels at 11, and a pivoted frame at 12 for operation to raise and lower the wheels 10 as desired. The supports 11 are here shown as integral parts of the frame. The frame is of the general form shown in Figs. 1 and 2, that is, of X-shape in plan, and bowed downwardly aft of its pivotal axis 13 to clear the propeller shaft 14 of the automobile in all positions of the frame. This propeller shaft 14 runs backward and downward from the transmission casing 15, to the differential 16 on the rear axle on which the ordinary rear wheels 17 of the automobile are mounted, as well known.

The frame 12 is loosely pivoted on a transverse shaft 19 carrying bevel gears 20 and 21. This shaft 19 is driven from a fore and aft jack-shaft 22, by means of the meshing of a bevel gear 23 on the jack shaft with bevel gear 20 on the transverse shaft. This jack shaft is driven from the propeller shaft 14, by means of a sprocket 24 adapted to be clutched when desired to the propeller shaft 14, a sprocket 25 fixed on the jack-shaft, and a sprocket-chain 26 passing over both sprockets.

The frame 12 also carries, loosely journaled in bearing extensions 12$^a$ thereon, a pair of extra-wheel drive-shafts 27, one for each extra wheel 10. The bevel gears 21 on the transverse shaft 19 mesh with bevel gears 28 on shafts 27. It will be seen that by the bevel gear drive from the transverse shaft 19 to the shafts 27, and by the mounting of the bevel gears 21 coaxially with the pivoting of the frame 12, the bevel gears 21 and 28 are in continuous driving mesh irrespective of pivotal adjustments of the frame 12.

Each wheel 10 is provided with a stub shaft 29 fixed within the hub of the wheel and having end portions protruding at opposite sides of the wheel. These end-portions of the stub-shafts are loosely journaled in said supports or forks 11 carried by the frame. The inner face of the hub of each wheel 10 carries fixedly a bevel-gear 30 meshing with a bevel gear 31 fixed on the rear end of the shaft 27 on that side of the automobile.

The frame 12 is normally elevated as shown in Fig. 2, with the wheels 10 well above the road, by means of retractile springs 18 fastened at their lower ends to the frame and at their upper ends to the chassis at a point not shown.

The sprocket 24 on the propeller shaft 14 is normally not driven by the latter, the sprocket being loose.

In order to lower the frame 12 when desired, to force the wheels 10 into coaction with the road, the following parts are provided. The foot-rest 32 of the automobile, just forward of the floor 33 in front of the driver's seat (not shown), is equipped with a hand-lever 34 fixedly pivoted at 35, and pivoted at its lower end to a draw-link 36. This draw-link at its rear end is provided with a cap 37, and near its rear end passes through a slot 38 cut in a downturned ear of a cross-piece 39 secured to the frame. Between the rear of said ear and the cap of the draw-link a suitably designed expansile spring 40 is interposed, coiled around the draw-link. When the driver pulls the handle 34' of the hand-lever 34 toward him, the draw-link moves forward, the frame 12 lowers about its point of pivoting, and the wheels 10 are forced into yielding engagement with the road; the familiar quadrant and lock-lever construction indicated generally at 41 affording the driver a well understood means of holding the frame to any desired depressed condition and the spring 40 to any desired compressed condition. This spring 40 is so designed and constructed that ordinarily the wheels 10 obtain the desired ground grip, yet the frame may give slightly on the wheels 10 encountering road irregularities, such as hummocks, stones and the like.

In order to cause the wheels 10 to be power driven during the period they are in contact with the road, such wheels being preferably thus thrown into the drive shortly before the frame is lowered, the following parts are provided. As stated above, the sprocket 24 is loose on the propeller shaft 14 and consequently idle. But this sprocket is arranged to be clutched to the shaft 14 by means of a sliding collar 42 suitably keyed on the shaft. The hub of this sprocket and the collar carry co-acting clutch parts (not shown), and the collar is normally held separated from the sprocket (by spring means not shown). The treadle 43 of a pedal 43 is arranged above the foot rest 32, the pedal being fixedly pivoted at 44. At its lower end the pedal is pivoted to the front end of a pull-link 45, pivoted at its rear end to one end of a clutch-shift lever 46 fixedly pivoted at 47. This shift lever 46, on depressing the treadle 43' to rock the pedal as indicated by the arrow in Fig. 2, throws the clutch parts on the sprocket 24 and the collar 42 into coaction.

In order to provide means for controlling the driving efficiency of the wheels 10, either to drive both wheels 10 simultaneously with the same tractive effect or to drive one or the other wheel 10 while permitting its mate to remain idle, in the latter case to facilitate pulling the automobile out of bad holes, a coupling and uncoupling means is associated with the transverse shaft 19 as indicated in Fig. 1. This means may be a type of clutch as illustrated, adapted to be operated manually by the driver as desired through suitable controlling means (not shown). The illustrated clutch, shown diagrammatically, includes the following parts: The transverse shaft 19 is really a compound shaft including an inner shaft 19$^a$ and two outer loose tubular shafts 19$^b$. The inner shaft has secured thereon the bevel gear 20. Each tubular shaft has secured thereon one of the bevel gears 21 near one end, and a clutch member 48 near its other end. Slidingly keyed on the inner shaft adjacent to each clutch member 48 is a coacting clutch member 49. Spring means (not shown) normally urges each pair of clutch members 48 and 49 into driving connection. A suitable coupling and uncoupling means for selectively releasing either of the clutch members 49 at will is indicated at 50, suitably actuable, by connections (not shown) at the driver's position. The device 50 is fixedly pivoted at 51 when its part 52 is rocked to the right the right-hand member 49 is released, and when said part is rocked to the left the left hand member 49 is released.

In order to provide means for braking the wheels 10, each wheel is provided with a brake band 53 adapted to be adjusted to braking condition relative to a peripheral surface of the wheel 10 by suitable operative connections which may be operated independently or simultaneously with the braking means for the usual rear wheels of the automobile, by the driver, as and when desired. Each brake-band 53 is suitably secured at one point to a part of the frame 12 and to another point to such an operative connection, as a cable 54. In the present case each cable 54 is attached at its forward end to the ordinary transverse brake-rod 55, of the automobile, to which rod is attached, as is well known, the operative connections 56 for the brake-bands 57 of the rear wheels 58 of the automobile. Thus, when the driver causes movement of the brake-rod 55 to brake the rear wheels of the automobile, he automatically also brakes the wheels 10, which latter braking is of course necessary if the wheels 10 are depressed on the road. In order, however, to simplify and facilitate the brake applications, means are provided to avoid adjusting the brake-bands 53 of the wheels 10 if these wheels are in elevated condition. This means is a lost-motion means, and is here shown as including, instead of the usual fixed arm on the brake-rod for attachment to each cable 54, an arm 59 adapted to permit a limited relative rocking movement between the brake-rod and itself when and only when the frame 12 is elevated. This result is attained by the pin and slot construction shown best in Fig. 2, the pin 60 being on the brake-rod in the case of each arm 59. The parts are so designed and arranged that when the frame 12 is depressed, each arm 59 is thereby turned to advance the slot-end 61$^a$ against the pin 60; so that any rotation of the brake-rod thereafter immediately acts on the arm to cause its cable 54 to actuate its brake-band 53.

The construction of each wheel 10 will now be described more in detail. Refer to Figs. 5 and 6 particularly. It has just been explained that each wheel 10 carries a brake-band 53, but the peripheral surface on which this brake-band acts has not yet been defined. By the construction of wheel now to be described, such surface is conveniently an underside of the rim or felly 62 of the wheel, and as a result an internal, expanding brake-band may be used, as illustrated, which is an important advantage due to the relatively small diameter of the wheels 10. Each wheel 10 includes here, between its hub and its felly, a plurality of radial spokes 63, the felly being rather wide as compared with the thickness of the spokes and being arranged to provide considerable peripheral eaves 62$^a$ and 62$^b$ on opposite sides of the wheel. The inner surface of the eave 62$^a$ is the brake-surface with which the brake-band 53 is adapted to coact as above described.

The remaining peripheral surfaces of the felly 62 of each wheel 10 are utilized as follows.

The outer surface of the felly 62 carries bolted thereon a plurality of separate metallic tread sections 64, as wide as the entire felly, and arranged with slightly separated ends. The bolts 65, it will be observed, are passed through the felly in substantially the same plane as the plane containing the spokes of the wheel. At suitably spaced points each tread-section 64 is provided with road-gripping spaced elements 64$^a$, here shown as cruciform embossings. These embossings are helpful when the present invention is used for extra-tractive efficiency in pulling the automobile out of holes, but are of special and unique advantage in using the extra wheels continuously on wet pavements to prevent skidding. Between the felly of the wheel and each tread-section 64 is interposed a block 65 of rubber or the like, or other resilient equivalent.

The inner surface of the felly, opposite to the side of the wheel 10 carrying the brake-band 53, that is, within the eave 62$^b$, is used for facilitating the mounting on the spokes of a group of radial webs 66. The outer edge of each such web 66 if fitted into a groove 66$^a$ cut across the felly opposite a spoke, and the inner end of each such web has an offset pin 67 fitted into an accommodating recess in said spoke; the web being finally locked in the position shown by means of a U-strap 68 embracing the spoke intermediate the ends of the web and riveted or bolted at its opposite ends to opposite sides of the web. The web equipment of each wheel, as just described, gives important extra-tractive effects on snow, mud, dust and other soft road coverings.

The operation of the new construction is believed to be clear from the foregoing description, and in concluding this specification it should be understood that the scope of the invention is to be taken from the appended claims primarily, and not from the details of construction and arrangements and combinations of parts shown in the drawings or described above, since many changes could be made therein and parts eliminated or added without departing from the invention.

I claim:—

1. In a motor vehicle having drive wheels, a pair of ground engaging traction wheels, motive means for actuating said drive wheels, and means for also selectively coupling either or both of said traction wheels to the motive means.

2. In a motor vehicle having drive wheels, a pair of auxiliary traction wheels, movable supports on which said traction wheels are journaled and whereby the wheels may be elevated above the road, means for depressing said supports to contact said traction wheels with the road, motive means for actuating said drive wheels, and means for also selectively coupling either or both of said traction wheels to the motive means.

3. In a motor vehicle having drive wheels, a pair of ground engaging traction wheels, motive means for actuating said drive wheels, a transverse shaft also driven from said motive means, and means for driving each traction wheel independently of the other from said transverse shaft.

4. In a motor vehicle, the combination of a pair of auxiliary traction wheels, movable supports on which said wheels are journaled and whereby the wheels may be elevated above the road, means for depressing said supports to contact said wheels with the road, and manually operable brake means for said auxiliary wheels.

5. In a motor vehicle having wheels, brakes and brake operating means, of auxiliary traction wheels adapted to be lowered into contact with the ground, brakes for said traction wheels, and means for operating said traction wheel brakes from said vehicle wheel brake operating means.

In testimony whereof I affix my signature.

CHRISTOPHER REYNOLDS.